United States Patent [19]
Pick et al.

[11] Patent Number: 4,817,914
[45] Date of Patent: Apr. 4, 1989

[54] ELECTROMAGNETIC VALVE ASSEMBLY

[75] Inventors: James M. Pick, Elk Grove; Wesley S. Swanson, Elkgrove Village, both of Ill.

[73] Assignee: Eaton Corporation, Cleveland, Ohio

[21] Appl. No.: 137,785

[22] Filed: Dec. 23, 1987

[51] Int. Cl.⁴ .......................... F16K 31/06; F16K 1/44
[52] U.S. Cl. ................................. 251/129.15; 251/362; 251/358
[58] Field of Search ................... 251/358, 129.15, 361, 251/362

[56] References Cited

U.S. PATENT DOCUMENTS

| | | |
|---|---|---|
| 3,062,992 | 11/1962 | Dahl et al. |
| 3,263,959 | 8/1966 | Wisniewski ................. 251/129.15 |
| 3,447,773 | 6/1969 | Huber . |
| 3,593,956 | 7/1971 | McCarty, Jr. . |
| 3,716,215 | 2/1973 | Washburn et al. ............. 251/358 |
| 3,872,878 | 3/1975 | Kozel et al. . |
| 4,666,125 | 5/1987 | Marts et al. .................. 251/358 X |
| 4,697,608 | 10/1987 | Kolze et al. ................. 251/129.15 X |

FOREIGN PATENT DOCUMENTS 635559 1/1962 Canada ............................ 251/358
0050756 5/1982 European Pat. Off. .

Primary Examiner—Arnold Rosenthal
Attorney, Agent, or Firm—R. A. Johnston

[57] ABSTRACT

An electromagnetically actuated appliance water inlet valve having an elastomeric valve seat with molded in reinforcement stiffener to minimize distortion at assembly and upon exposure to high water line pressures. Lugs on the electromagnetic armature guide engage the periphery of the reinforcement to create a subassembly of armature, return spring, valve seat and guide for ease and economies of assembly. One embodiment of the reinforcement comprises an apertured disc. Other embodiments comprise an annular ring having "C" shaped and "U" shaped transverse sections. Tabs provided in the base of the ferromagnetic pole frame are deformed over a recess in the valve body to provide positive retention of the pole frame to the body.

17 Claims, 3 Drawing Sheets

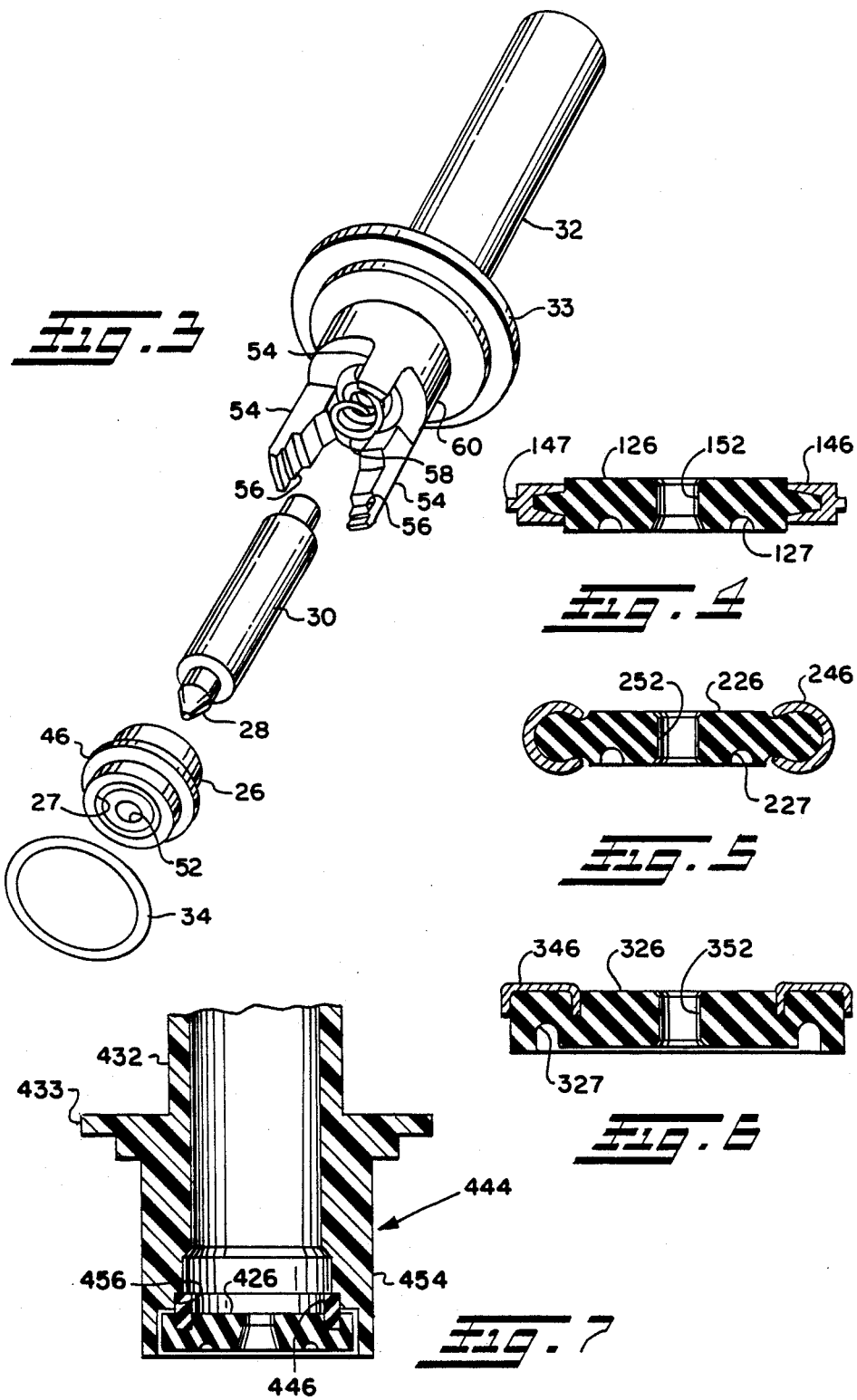

ELECTROMAGNETIC VALVE ASSEMBLY

BACKGROUND OF THE INVENTION

The present invention relates to electrically energized electromagnetically actuated valves for service in appliances such as icemakers employed in household refrigerators. Valves of the aforesaid type are required to operate with a low wattage power consumption and to be compact and inexpensive to manufacture. In particular, electromagnetically actuated valves employed for use in refrigerator icemakers are required to provide long life when connected to water supplies of varying impurity and chemical content. Heretofore, electromagnetically actuated valves for refrigerator icemakers have employed a solenoid actuated poppet and a valving chamber formed in the plastic valve body with a plastic guide closing the valving chamber and functioning as a guide for the movable armature.

Valves of the aforesaid type typically employ a ferromagnetic member for the armature with the poppet formed on one end thereof; and, a resilient elastomeric seat is usually provided in the valving chamber for contact by the poppet for performing the valving function. A valve construction of the aforementioned type is shown and described in U.S. Pat. No. 4,697,608 and commonly assigned to the Assignee of the present application. However, difficulties have been encountered in manufacturing such a valve construction in assembling the valve seat, armature and plastic armature guide for closing the valving chamber onto the body of the valve. In particular, problems have been encountered in assembling the valve seat into the body and providing a static seal therearound for preventing flow bypassing of the valve seat for the poppet and leakage to the valve outlet when the poppet is in the closed position and seated on the elastomeric valve seat.

In addition, in providing elastomeric valve seats in valves of the aforementioned type, problems have been encountered with deformation of the valve seat under the forces of the line pressure of the water acting against the valve seat when the valve is in the closed position. Where unusually high water line pressures are encountered in a particular water supply line, deformation of the elastomeric valve seat has been experienced. In numerous instances, the deformation has been sufficient to either restrict or close the outlet of the valve seat so that an adequate flow of water cannot pass when the poppet is lifted from the valve seat upon energization of the solenoid.

Furthermore, problems have been encountered in manufacturing of valves of the aforementioned type in assembling the valve seat, poppet/armature and the plastic valve guide member for closing the valving chamber onto the valve body.

Thus, it has been desired to find a way or means of enabling economical and reliable assembly of an electromagnetically actuated solenoid operated appliance water valve having an elastomeric valve seat. It has been further desired to provide a construction for such a valve in which the elastomeric valve seat is not distorted so as to be rendered inoperative during assembly or when exposed to unusually high water line pressures in service.

Additionally, in appliance water valves of the aforementioned type it has been desired to find a way or means of economically and rigidly retaining and fastening the ferromagnetic pole frame over the non-metallic armature guide in a manner which eliminates the need for separate fasteners and avoids undue strain on the armature guide.

SUMMARY OF THE INVENTION

The present invention provides an improved version of the electromagnetically actuated solenoid operated appliance water valve shown and described in U.S. Pat. No. 4,697,608 commonly assigned to the Assignee of the present invention.

The present invention provides an elastomeric valve seat for an electromagnetically actuated appliance water valve with a rigid insert or stiffening member disposed about the periphery of the elastomeric valve seat to provide stiffened surfaces for engagement with the armature guide member for providing a subassembly of the valve seat, armature, bias spring and armature guide for assembly into the valve body. The stiffening member in one embodiment is an annular member formed over the periphery of elastomeric valve seat member; and, in another embodiment the rigid member comprises a disc having portions thereof embedded in the elastomeric valve seat during the molding operation. The stiffening member for the valve seat in the present invention supports the elastomeric valve seat material and resists deformation thereof. The stiffening member facilitates assembly of the valve seat, armature, bias spring and armature guide as a subassembly; and, minimizes elastomeric valve seat deformation during the subassembly. Upon installation of the subassembly into the valve body, the insert acts to minimize deformation of the elastomeric valve seat and to provide for and prevent thereof about closing of the valving orifice due to line pressure forces acting on the elastomeric valve seat. An annular groove in face of the valve seat distal the poppet also aids in strain relief to prevent distortion of the valving orifice sufficiently to cause malfunction.

In another aspect of the invention, integrally formed lugs or tabs are provided on the base of the ferromagnetic pole frame; and, upon assembly of the pole frame over the armature guide, the tabs are deformed over a cooperating retaining recess formed in the retaining ring or valve body to provide positive retention of the pole frame directly to the valve body.

BRIEF DESCRIPTION OF THE DRAWINGS

FIG. 3 is an exploded view of the armature, valve seat, spring and armature guide subassembly of the present invention;

FIG. 4 is a transverse section view of an alternate embodiment of the elastomeric valve seat;

FIG. 5 is a transverse section of another embodiment of the elastomeric valve seat of the present invention; and, FIG. 6 is a transverse section of another embodiment of the elastomeric valve seat of the present invention; and FIG. 7 is a transverse section of another embodiment of the invention.

DETAILED DESCRIPTION

Figure 1:
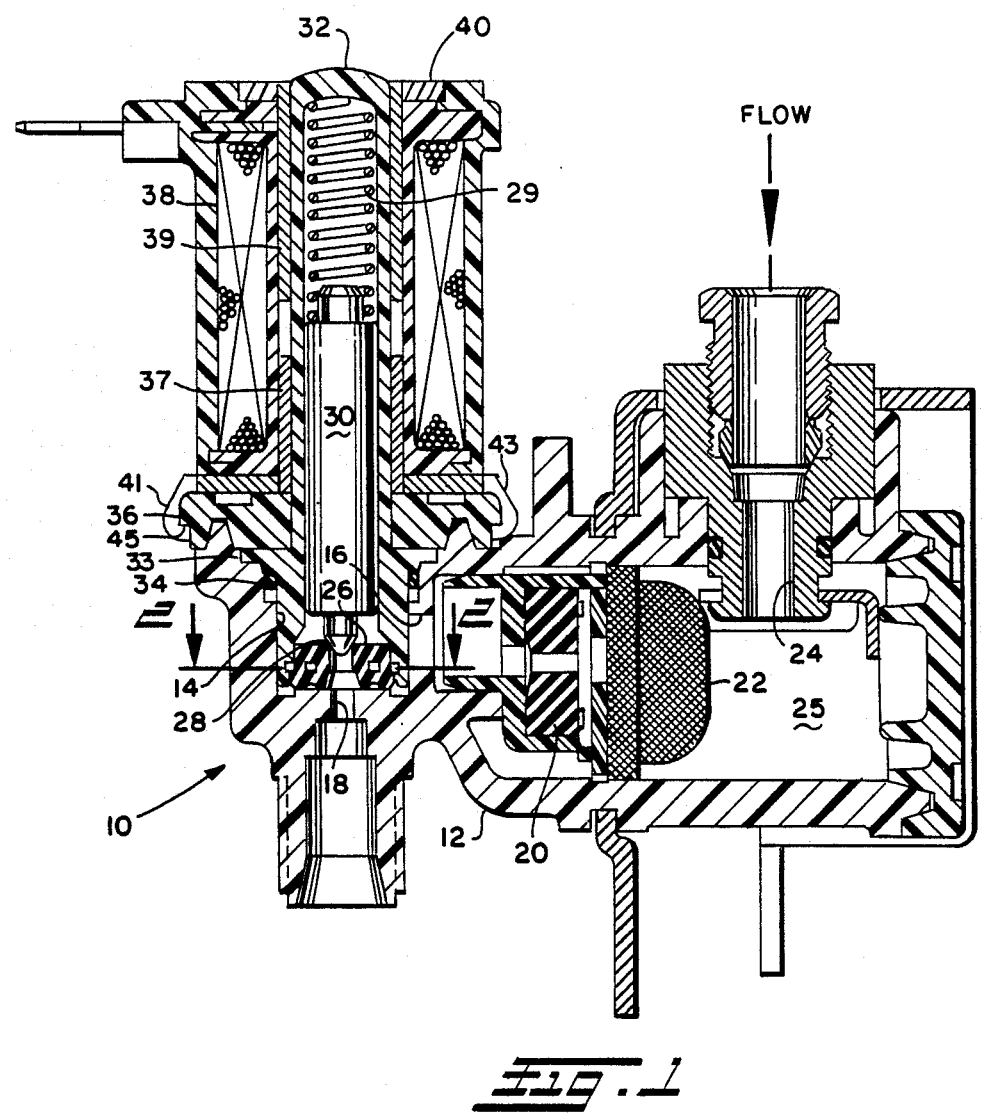
FIG. 1 is a cross-sectional view of the valve assembly of the present invention.

Referring to FIG. 1, the valve assembly of the present invention is indicated generally at 10 as having a body 12 formed of suitable plastic material and defining therein a valving cavity 14 having an inlet passage 16 communicating with the valving cavity and an outlet passage 18 for providing discharge from the valving cavity. The inlet passage is supplied via a flow regulator 20 and screen 22 which receives flow therethrough from an inlet fitting passage 24 and inlet chamber 25.

An elastomeric valve seat means 26 is disposed over the outlet passage 18 and is contacted by a poppet 28 preferably formed on one end of a ferromagnetic armature 30. Armature 30 is received in and guided by an armature guide member 32 having a generally tubular configuration closed at one end with an enlarged diameter flange 33 formed at the open end and which forms a closure for cavity 14 and is sealed thereabout by seal ring 34 and retained thereon by retaining ring 36 attached to the body 12 by suitable expedient, as for example, non-metallic weldment.

A pair of tubular ferromagnetic pole pieces 37, 39 are received over the armature guide and axially spaced define an air gap therebetween. An electromagnetic coil assembly 38 is received over the pole pieces and a pole frame 40 of ferromagnetic material completes the magnetic loop about the coil at the ends of the pole pieces. Upon energization of the coil 38, the armature 30 and poppet 28 are lifted to open the valve seat and permit flow therethrough to the outlet 18. The construction of the valve assembly 10 is generally similar to that shown and described in U.S. Pat. No. 4,697,608 issued to Kolze et al and assigned to the Assignee of the present invention. Accordingly, further detailed description of the overall valve construction has been omitted herein for the sake of brevity.

However, an aspect or novel feature of the present invention is shown in FIG. 1 by reference numerals 41 and 43 which denote a plurality of integrally formed lugs or tabs extending from the base of pole frame 40. Upon assembly of the coil and pole frame 40 over the armature guide 40, tabs 41 and 43 are deformed over a shoulder 45 formed on the outer periphery of welded ring 36 for securely retaining the pole frame onto the body without application of clamping loads to guide 32.

Figure 2:
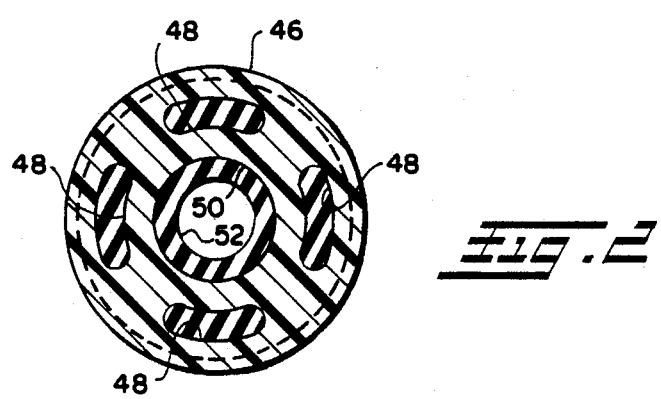
FIG. 2 is a section view taken along section indicating lines 2—2 of FIG. 1.

Referring to FIGS. 1, 2 and 3, the valve seat means 26, spring 58, armature 30 and armature guide 32 comprise an aspect or feature of the invention as a subassembly indicated generally at 44.

Another aspect or feature of the invention is illustrated in FIGS. 1 and 2 and comprises a rigid reinforcement 46 having portions thereof embedded in the elastomeric valve seat means 26. In the presently preferred practice, the insert 46 has a plurality of apertures 48 provided therein intermediate the inner and outer periphery of the valve seat means 26. The apertures 48 permit elastomeric material to be molded therethrough for retaining the insert 46 in the valve seat means 26. In the presently preferred practice, the insert 46 has a generally flat disc configuration and is formed of a rigid material such as brass. However, it will be understood that other configurations and other materials may be found suitable within the practice of the invention.

In the presently preferred practice, two each of the lugs 41, 43 are provided in spaced relationship of opposite sides of the pole frame 40.

Referring to FIGS. 2 and 3, the rigid insert 46 is shown with the outer periphery thereof extending radially outwardly of the elastomeric periphery of the valve seat means 26. It will be understood however, that the insert 46 need not have its outer periphery extending beyond the outer periphery of the valve seat means 26; but, the periphery of the insert 46 must extend generally outwardly to the outer periphery of the valve seat means 26. The inner periphery 50 of the insert 46 is sized such that a suitable amount of elastomeric material is molded thereabout to form the outlet flow orifice 52 in the valve seat means 26. Although the disc shaped insert of FIG. 2 has been illustrated with discrete apertures 48 formed therein for molding of elastomer therethrough, it will be understood that other configurations of the disc shape may be employed, as for example, a disc having an outer ring with a plurality of radially inwardly extending finger-like portions.

Referring to FIG. 3, the elastomeric valve seat means 26 has an annular groove 27 formed in the face thereof distal said poppet 28 which groove 27 serves as a strain relief to minimize distortion of flow orifice 52 upon installation in cavity 14 and upon exposure of the valve seat to unusually high water line pressures.

Referring to FIG. 3, the spring-guide-armature-valve seat subassembly 44 incorporates a plurality of extensions or lugs 54 extending axially from the open end of the armature guide in circumferentially preferably equally spaced arrangement. Each of the lugs has a registration surface 56 which engages the outer periphery of the valve seat insert 46 in a manner to retain the valve seat in position against the force of the spring 58 which is received in the armature guide and acts against the closed end thereof to bias the poppet surface 28 against the valve seat means 26. In the presently preferred practice, the registration surfaces 56 provide a frictional or detent engagement with the outer periphery of the insert 46.

The seal ring 34 is received over a cylindrical portion 60 provided at the base of the lugs 54 for providing sealing about the periphery thereof upon installation of the subassembly 44 into the valve cavity 14. The subassembly 44 thus provides a convenient and economical means of assembly the valve seat means 26, armature 30, spring 58 and armature guide 32 into the valve body 12.

Referring to FIG. 4, an alternate embodiment of the valve seat means 26 is illustrated wherein the elastomeric valve seat 126 has the rigid reinforcement provided in the form of an annular member 146 having a generally rectangular C-shaped configuration in transverse section with a circumferential rib 147 provided thereon for engagement with the registration surfaces 56 in the lugs 54 armature guide. The embodiment of FIG. 4 is preferably constructed by molding the elastomeric material for the valve seat 126 into the interior region of the reinforcement 146.

The lower surface of the valve seat means 126 of FIG. 4 has an annular groove 127 formed therein which serves as a localized strain relief upon assembly of the valve seat means into the valving cavity 14. The groove 127 serves to minimize local deformation of the flow orifice 152 upon installation of the valve seat means into the valving cavity 14 and upon exposure of the valve seat to unusually high line pressures.

Referring to FIG. 5, another embodiment of the valve seat means is illustrated wherein the elastomeric valve seat member 226 has the rigid reinforcement provided thereon in the form of an annular member 246 having a generally C-shaped configuration in transverse section with the outer periphery thereof forming a smooth curved surface for engaging the shouldered portions 56 of the armature guide.

The lower face of the valve seat means 226 in the FIG. 5 embodiment has an annular groove 227 formed therein for providing strain relief and minimizing deformation of the flow aperture 252 upon installation of the subassembly into the valving cavity 14 and exposure of the valve seat to unusually high water line pressures.

Referring to FIG. 6, still another embodiment of the valve seat means is illustrated wherein the elastomeric valve seat member 326 has the insert provided in the form of an annular member having a generally inverted U-shaped configuration in transverse section with the outer flange thereof extending over and adjacent the outer periphery of the elastomeric member 326. The inner periphery of member 346 is retained in a recess in the elastomeric material of the seat 326. An annular relief groove 327 is provided in the lower face of the valve seat member 326 for relieving the localized strain of installation of the valve seat means in the valving cavity 14; and, the groove 327 minimizes deformation of the valve seat 326 in the region of the flow orifice 352 upon exposure to unusually high water line pressures.

Referring to FIG. 7, another embodiment of the invention is illustrated wherein the elastomeric valve seat denoted by the reference numeral 426 has an insert 446 recessed or embedded in the elastomeric valve seat and extending from the upper surface thereof. In the embodiment of FIG. 7, the armature guide 432 has the portion 454 consisting of a plurality of discrete lugs extending from the flange 433. The lug portion 454 of the armature guide 432 has formed therein a shoulder or counterbore 456, which has received therein in frictional engagement the upper axial end of the insert 446 for retention of the elastomeric seat onto the armature guide. The embodiment of FIG. 7 thus provides a subassembly of the armature guide, valve seat, armature and spring in a manner similar to the embodiment of FIG. 3; however, it will be understood that the armature and spring have been omitted in FIG. 7 for simplicity.

The present invention thus provides a unique and novel electromagnetic valve assembly wherein the valve seat, armature/poppet and armature guide and armature return spring may be prepared as a subassembly and in installed as a unit into the valve body for ease and economy of manufacturing assembly. The valve seat of the present invention employs an elastomeric member having a rigid reinforcement or insert enabling frictional or detent engagement of the valve seat with engagement surfaces provided on the armature guide to form the above-described subassembly. The rigid reinforcement in the elastomeric valve seat and a groove in the elastomer aid in minimizing local deformation of the flow orifice upon assembly of the valve seat into the valving cavity and upon exposure to elevated waterline pressures.

The present invention also provides for unique integrally formed tabs for securing the ferromagnetic pole frame directly to the valve body.

Although the invention has been described above with respect to the illustrated embodiments, it will be understood that the invention is capable of modification and variation and is limited only by the scope of the following claims.

We claim:

1. A subassembly for an electromagnetically actuated valve comprising:
   (a) guide means formed of non-magnetic material and defining an open hollow, said guide means adapted to be received and sealed in a valve housing;
   (b) armature means formed of ferromagnetic material and received in said hollow and guided for sliding movement therein, said armature means having a poppet disposed on one end thereof;
   (c) retaining means formed integrally with said guide means and extending from the opening of said hollow, said retaining means defining thereon a plurality of registration surfaces;
   (d) valve seat means having;
      (i) a member formed of elastomeric material with a valving passage therethrough and a poppet seating surface formed on one end thereof, and
      (ii) a rigid insert member having first portions thereof embedded in said elastomeric material and second portions thereof extending radially outwardly beyond said first portions, said second portions being received in engagement with said registration surfaces of said guide means for retaining said valve seat means thereon; and,
   (e) means operative to bias said armature means in a direction urging said poppet into contact with said valve seat means.

2. The subassembly defined in claim 1, wherein said second portions of said rigid member are engaged with said registration surfaces in detent engagement.

3. The subassembly defined in claim 1, further comprising a sealing ring received over said guide means, said sealing ring adapted to seal about said guide means upon installation in an electromagnetically actuated valve.

4. The subassembly defined in claim 1, wherein said rigid insert member comprises a metal disc with said first portions thereof comprising regions between and surrounding a plurality of circumferentially spaced apertures in said disc.

5. The subassembly defined in claim 1, wherein said rigid insert member comprises a metal disc having a plurality of circumferentially spaced apertures therein with said elastomeric material molded integrally thereover and therethrough.

6. The subassembly defined in claim 1, wherein said rigid insert has said second portions extending outwardly to the periphery of said elastomeric material.

7. The subassembly defined in claim 1, wherein said rigid member has the second portions thereof extending outwardly beyond the periphery of said elastomeric material.

8. The subassembly defined in claim 1, wherein said rigid member comprises a perforated metal disc having said elastomeric material molded integrally through said perforation.

9. The subassembly defined in claim 1, wherein said registration surfaces comprise a plurality of fingers extending outwardly from the open end of said guide hollow with each of said fingers for engaging said valve seat means rigid member for positioning and retaining said valve seat means.

10. A subassembly for an electromagnetically actuated valve comprising:
   (a) guide means formed of non-magnetic material and defining a closed bore at one end with the open end thereof adapted to be sealingly mounted on a valve body;

(b) armature means formed of ferromagnetic material, said armature means received for sliding movement in said bore and having a poppet formed on the end thereof opposite said closed bore end;
(c) retaining means disposed about said bore and extending from the open end thereof;
(d) valve seat means including a member formed of elastomeric material and, disposed adjacent said armature means poppet, and including an annular member formed of rigid material disposed generally about the periphery thereof and engaging said retaining means for retaining said valve seat means in position with respect to said armature means poppet; and,
(e) biasing means urging said armature means in a direction outwardly of said bore and toward said valve seat means.

11. The subassembly defined in claim 10, wherein said retaining means comprises a plurality of lugs extending in a direction generally parallel to the direction of movement of said armature means and disposed in peripherally spaced arrangement about said armature means.

12. The subassembly defined in claim 10, wherein said annular member has portions thereof embedded in said elastomeric material.

13. The subassembly defined in claim 10, wherein said annular member has a generally C-shaped configuration in transverse section.

14. The subassembly defined in claim 10, wherein said annular member has a generally U-shaped configuration in transverse section.

15. The subassembly defined in claim 10, wherein said elastomeric member has an annular groove formed in the face distal said poppet for localized strain relief.

16. An electromagnetically actuated valve assembly comprising:
(a) a valve body defining a valving chamber communicating with an inlet and outlet;
(b) armature guide means formed of non metallic material and disposed on said body and sealed thereabout to form a portion of the wall of said valving chamber, said guide means having formed integrally therewith valve seat retaining means;
(c) armature means formed of ferromagnetic material and received in said guide means for guided movement therein and including thereon means defining a poppet;
(d) valve seat means formed of resilient elastomeric material received on said retaining means as a subassembly with said guide means and disposed in said valving chamber for cooperating with said poppet upon movement thereof for controlling flow between said inlet and outlet;
(e) a rigid member having portions thereof engaging said valve seat means and having peripheral portions thereof engaging said guide means and operative for retaining said valve seat means on said guide means as said subassembly; and,
(f) coil means received over said armature guide means and operative upon electrical energization to effect movement of said armature means.

17. An electromagnetically actuated valve assembly comprising:
(a) a valve body defining a valving chamber communicating with an inlet and outlet;
(b) armature guide means formed of nonmetallic material and disposed on said body and sealed thereabout to form a portion of the wall of said valving chamber;
(c) armature means formed of ferromagnetic material and received in said guide means for guided movement therein and including thereon means defining a poppet;
(d) annular valve seat means formed of resilient elastomeric material and received on said guide means forming a subassembly with said armature means and said guide means and disposed in said valving chamber for cooperating with said poppet upon movement thereof for controlling flow between said inlet and outlet;
(e) said valve seat means having an annular strain relief recess formed on the downstream or outlet side thereof surrounding said outlet and disposed radially outwardly thereof for relieving fluid pressure strain in the central aperture region of said valve seat means.

* * * * *